United States Patent [19]

O'Rell et al.

[11] 4,264,691

[45] Apr. 28, 1981

[54] BATTERY INTERSEPARATOR

[75] Inventors: Dennis D. O'Rell, Boxborough, Mass.; Nguyen V. Hien, Hightstown, N.J.; Joseph T. Lundquist, Jr., Columbia; Christian B. Lundsager, Ashton, both of Md.

[73] Assignee: W. R. Grace & Co., New York, N.Y.

[21] Appl. No.: 57,412

[22] Filed: Jul. 13, 1979

[51] Int. Cl.³ ............................................. H01M 2/16
[52] U.S. Cl. ................................... 429/250; 429/251; 428/252; 156/181
[58] Field of Search ............... 429/249, 250, 251, 252, 429/254; 162/157 R; 428/252, 302

[56] References Cited

U.S. PATENT DOCUMENTS

| | | | |
|---|---|---|---|
| 3,247,025 | 4/1966 | Beaulieu | 136/146 |
| 3,272,657 | 9/1966 | Zenczak | 136/148 |
| 3,351,495 | 11/1967 | Larsen et al. | 136/146 |
| 3,472,700 | 10/1969 | Kollman | 429/250 |
| 3,743,272 | 7/1973 | Nowotny et al. | 264/69 |
| 3,891,499 | 6/1975 | Kato et al. | 162/157 R |
| 3,920,508 | 11/1975 | Tonemori | 162/168 R |
| 3,967,978 | 7/1976 | Honda et al. | 429/250 |
| 3,987,139 | 10/1976 | Kozlowski | 264/141 |
| 3,995,001 | 11/1976 | Vroomans et al. | 264/8 |
| 3,997,648 | 12/1976 | Davis et al. | 264/140 |
| 4,007,247 | 2/1977 | Ballard et al. | 264/140 |
| 4,024,323 | 5/1977 | Versteegh | 429/249 |

FOREIGN PATENT DOCUMENTS

| | | |
|---|---|---|
| 2509823 | 9/1975 | Fed. Rep. of Germany . |
| 868651 | 8/1957 | United Kingdom . |
| 876693 | 9/1961 | United Kingdom . |
| 891945 | 3/1962 | United Kingdom . |
| 941461 | 11/1963 | United Kingdom . |

Primary Examiner—Donald L. Walton
Attorney, Agent, or Firm—Howard J. Troffkin

[57] ABSTRACT

A battery interseparator useful in alkaline battery systems, and a process of forming the same, is formed from a composition having 30-70% by weight synthetic pulp, 15-65% by weight alkali resistant inorganic filler, and 1-35% by weight of long fibers having lengths of between ¼ and 1 inch. The long fibers may be polyester, polyacrylic, polyamide, polyolefin, or other staple fiber material. The process for forming the subject battery interseparator requires first forming a substantially uniform aqueous mixture of the subject composition, sequentially treating said composition with a combination of a cationic and an anionic agent, applying the treated composition to a standard paper-making apparatus at a grammage rate to cause the resultant dried sheet to have a thickness of less than 10 mils, and forming a sheet product.

18 Claims, 1 Drawing Figure

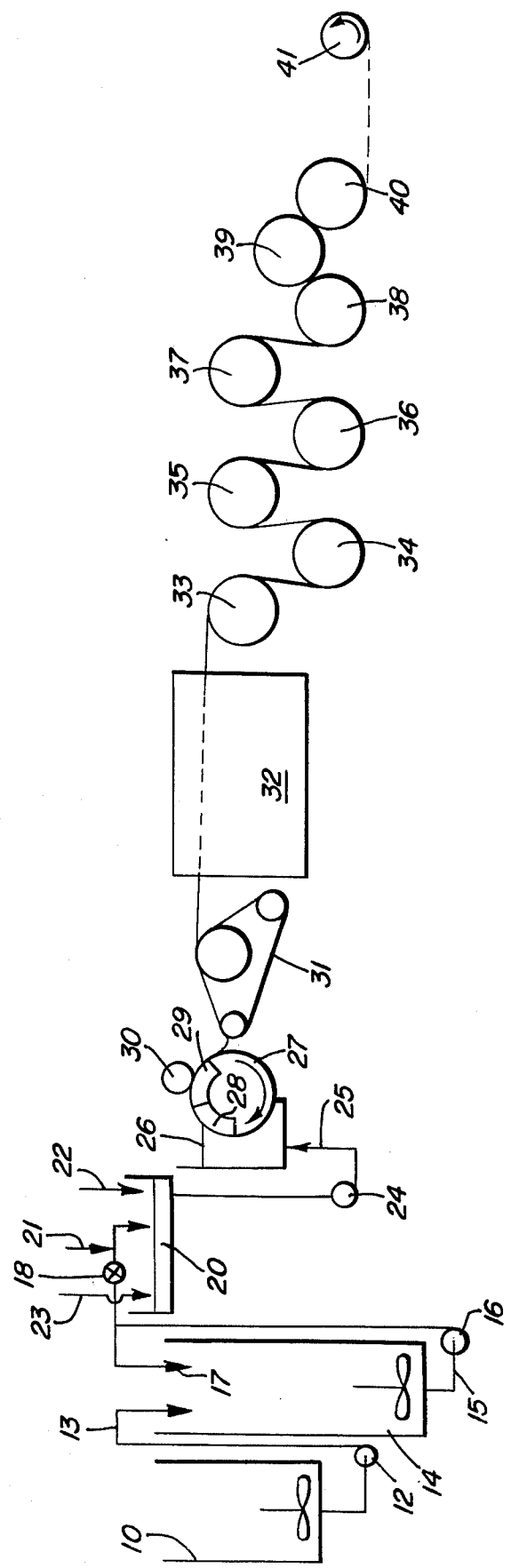

BATTERY INTERSEPARATOR

BACKGROUND OF INVENTION

The subject invention is directed to a battery interseparator suitable for use in an alkaline battery system and to a method of forming the same.

Because of their high energy density, alkaline battery systems, such as nickel-zinc secondary alkaline battery systems, have great potential for replacing the more conventional lead-acid battery system in a number of terrestrial applications. However, extending the cyclic life of such batteries beyond that presently attainable and reducing the cost of all the components are required criterias which must be met to make the alkaline battery system an effective energy source.

One of the recognized key components in attaining an extended battery life and efficiency is the battery interseparator. The interseparator is a porous diaphragm located between the positive and/or negative plates and the dendristatic separator diaphragm of an alkaline battery system so as to (1) provide an electrolyte reservoir, (2) provide uniform electrolyte distribution across electrode and separator surfaces to permit uniform current density and, (3) allow space for electrode expansion during use. In order to achieve these results, the resultant diaphragm must be capable of exhibiting a high degree of absorption or wicking, and be sufficiently porous to carry and evenly distribute the electrolyte of the battery system.

It is also desirable to have an interseparator diaphragm which is very thin, such as less than 10 mils, in order to minimize the amount of electrolyte required and, thereby, maximize the energy density of the resultant system. It has not been generally believed that one can produce a sheet product of such small thicknesses due to the high content and nature of the filler required in interseparator sheets suitable for alkaline battery systems.

Conventional lead-acid and secondary alkaline battery systems have certain components, such as electrodes, electrolytes, separators, etc., which, though commonly named, are distinctly different entities having different functions, and are required to have different physical and chemical properties. It is easily recognized that the electrodes of a lead-acid battery system are distinctly different from the electrodes used in a secondary alkaline battery system, such as a nickel-zinc alkaline battery system. Similarly, separators used in a lead-acid system are distinctly different from those used in a secondary alkaline battery system. The lead-acid battery separator is a material positioned between electrode plates of opposite polarity t insure maintenance of a separation. Any material which is superimposed between adjacent surfaces of the plates to retain the desired separation is satisfactory. Normally, these separators are produced of materials which are capable of being formed into sheets of (1) substantial thickness or with a matte surface to aid in the separation of the plates, (2) substantial porosity to readily permit the electrolyte to pass through, and (3) must be chemically inert to acidic electrolyte. Separators of alkaline battery systems not only aid in separating the plates of opposite polarity, but mainly function as a dendristatic diaphragm. The separator of alkaline battery systems, such as a nickel-zinc secondary alkaline battery, must, therefore, have very low porosity in order to inhibit the growth of dendrites therethrough, must be very thin to minimize electrical resistance, and must be of a material which is chemically inert to alkaline electrolyte while allowing electrolyte passage therethrough.

Alkaline battery systems usually utilize an interseparator in combination with the dendristatic separator diaphragm. This is especially true with alkaline battery systems which utilize nickel and/or zinc electrodes. The interseparator, as discussed above, must have a combination of properties including having a high degree of wicking capability, such as at least about 5 cm/24 hours as determined by standard techniques, to aid in overcoming the deficiencies of the separator diaphragm, and be formed of material which is capable of being produced into very thin, highly porous sheets of good integrity. The interseparator component is specific to alkaline battery systems.

Battery interseparators which are used today in alkaline battery systems are commonly composed of polypropylene, polyamide, or nylon non-woven sheets. These interseparators suffer from sufficient wicking and/or lack the necessary chemical and/or oxidation resistance in an alkaline environment to effectively aid in enhancing the battery system. The development of alkaline secondary batteries, particularly nickel-zinc, has been hampered by the absence of suitable interseparators for these applications.

It is an object of the present invention to provide a fibrous, filled battery interseparator suitable for use in an alkaline battery system.

It is another object of the present invention to provide a battery interseparator that can be prepared on a conventional paper machine, has a significantly smaller maximum pore-size than conventional non-woven fiber-based battery interseparator webs, and, thereby, aids in inhibiting dendrite growth along with the separator used in conjunction therewith.

It is still another object of the present invention to provide a battery interseparator of a thinness of not greater than 10 mils which can be prepared on a paper machine and exhibits a tensile strength of greater than 200 lbs/in$^2$ in the machine direction, and sufficient flexibility to be formed around the electrode plate.

SUMMARY OF THE INVENTION

A battery interseparator suitable for use in alkaline battery systems is provided which is formed from a composition of from about 30 to 70 percent polyolefin synthetic pulp, from about 15 to 65 percent alkaline resistant inorganic filler, and from about 1 to 35 percent of long fibers formed from a synthetic polymer selected from polyolefin, polyester, polyamide, polyacetate, or polyacrylic acid or ester, or mixtures thereof having lengths of at least about 0.25 inch. The subject interseparator is readily produced by forming an aqueous slurry of the above-described composition, sequentially treating the composition with a cationic and then an anionic agent, applying the treated composition to a web forming apparatus at a rate to produce a resultant web of a thickness of not greater than 10 mils, and dewatering said composition to form the desired interseparator sheet product.

BRIEF DESCRIPTION OF THE DRAWING

FIG. 1 is a schematic view of a laboratory rotoformer paper machine and related equipment used for practicing the process of the present invention.

DETAILED DESCRIPTION OF INVENTION

Unless otherwise stated, percents in this application are by weight based upon 100% end composition weight. Thus, 10% means that the component constitutes 10 wt. parts out of every 100 wt. parts of total composition.

The present invention is an interseparator for alkaline battery systems formed of a composition comprising a substantially uniform mixture of 30 to 70% polyolefin synthetic pulp, 15 to 65% of an alkali resistant inorganic filler and 1 to 35% of long fibers of synthetic polymer that are at least about 0.25 inches long. The long fibers should be present in not greater than 50 percent of the contents of the polyolefin synthetic pulp used.

Polyolefin synthetic pulp found useful in forming the subject interseparator material is a polyolefin of predominantly short fibrous material having fiber size and shape similar to cellulosic wood pulps. For example, fiber lengths averaging from about 1 to 4 millimeters for the presently used polyolefin synthetic pulp are suitable and compare to 0.5 to 5 millimeters for wood pulp. Fiber lengths are measured according to TAPPI standard T232. The polyolefin synthetic pulp is preferably a polyethylene or polypropylene synthetic pulp and, more preferably, a polyethylene synthetic pulp. Such synthetic pulps are described in a number of U.S. Pat. Nos., including 3,743,272; 3,891,499; 3,902,957; 3,920,508; 3,987,139; 3,995,001; 3,997,648; and 4,007,247, the teachings of which are incorporated herein by reference. It has been found that the most preferred synthetic pulp used in the subject invention be formed from a low pressure polyethylene having a viscosity average molecular weight range of 20,000 to 2,000,000, as described in U.S. Pat. No. 3,920,508 at Column B, lines 21-31 and 39-51. The synthetic pulp fibers may optionally contain a water dispersing agent, or a small amount of conventional cellulosic wood pulp. It has been found in the present invention that the most preferred synthetic pulps are those having the highest degree of branching or fibrillation. Polyolefin fibers of the above type are commercial products.

The inorganic filler can be any particulate material which is substantially inert to conventional alkaline electrolyte. Alkali resistant inorganic fillers found most suitable are, for example, titanium dioxide, alumina, calcium oxide, calcium hydroxide, calcium titanate, potassium titanate, magnesium hydroxide, magnesium oxide, or zirconium hydroxide, or mixtures thereof. Of the above fillers, those preferred are titanium dioxide and alumina. It has been found that unexpectedly superior, i.e., very low electrical resistance, good wicking, superior tensile properties, and high chemical resistance to alkali attack, interseparator diaphragms are formed when the filler is titanium dioxide. The particulate filler should have a particle size of from about 0.001 to about 1 microns, a surface area of from about 5 to 200 square meters per gram, and a pore volume (BET) of from about 0.01 to about 1 cc per gram.

The long fibers required to be used in producing the subject interseparator are formed from synthetic polymers. The polymeric material must be capable of being formed into fibers which exhibit good tensile strengths, such as of at least 2 gm/denier and, preferably, from about 3 to 10 gm/denier. The long polymeric fibers found useful can be made from polyolefins, polyesters, polyacrylics, polyamides, polyacetates, and polyacrylates as, for example, fibers of polypropylene, polyethylene terephthalate, polyacrylate acid, polyacrylonitrile, or polymethyl methacrylate, polycaprolactam, cellulose acetate, and the like. The most preferred polymeric fibers are formed from a polyester, such as polyethylene terephthalate or a polyolefin, such as polyethylene or polypropylene, or a polyamide, such as polycaprolactam or poly(hexamethylene adipamide). The long fibers should have a denier ranging from about 1.5 to about 12, and a length of at least about 0.25 inches and, preferably, ranging from 0.25 to about 1 inch. It has been found that a desired product is preferably formed by limiting the concentration of long fiber to not greater than 50 percent of the concentration of the polyolefin synthetic pulp. The preferred amount of long fibers contained in the composition is from 1 to 15 percent. These fibers are commercially available and may be surface treated with an effective amount of a surfactant to aid in their dispersion in water to cause more uniform mixing of the subject components.

It has been found that the desired thin sheet interseparator of the subject invention unexpectedly can be formed by treating the above described components with ionic agents, such as cationic and anionic polymers. It is believed that these agents aid in retaining the large proportional amount of alkali resistant inorganic filler in the web during its formation into the thin sheet product by the process described herein below. It has been found particularly advantageous to use a two component system comprising a combination of a cationic and an anionic agent which are added sequentially and, preferably, at some distance apart from each other. Agents which have been found particularly useful in the present invention are cationically and anionically modified high molecular weight polyacrylamides. Preferably, the cationic agent is added first. The retention aids are preferably used at levels ranging from about 0.01 weight percent to about 1.0 weight percent, based on the weight of the solids in the slurry formed during processing to form the web. The more preferred range is 0.04 to 0.75 weight percent, with from about 0.04 to 0.3 weight percent being still more preferred. Preferably, the cationic copolymer is added in an amount ranging from 0.01 to 0.50% and, more preferably, 0.02 to 0.15%. The anionic copolymer is preferably added at the same rate. The residual ionic agent content in the battery interseparator is preferably 0.01 to 1.0%, more preferably, 0.01 to 0.15% of cationic polymer and 0.01 to 0.15% of anionic polymer.

Other aids, such as wet strength resins and the like, are also useable and within the broad purview of the invention.

Battery interseparators formed in accordance with the present invention are porous materials having a median pore size (diameter) of less than 10 microns with maximum pore size of less than about 35 microns, as determined by standard separator screening methods. The normalized electrical resistance of the resultant interseparator is less than about 10 ohm-cm.

The electrical resistance of the battery interseparator of the present invention may be improved by treatment, normally surface treatment of the formed sheet product, with surfactants. Surfactants which may be used in the present invention include nonionic surfactants, such as ethyloxylated alkylphenols, alkylaryl polyethylene glycols, or other surfactants which have been used by those skilled in alkaline battery development. The level of surfactant employed may range from trace amounts up to about 1% by weight. The specific level used will depend upon the specified surfactant, but is in practice limited to those levels which do not have any adverse effect on battery performance or battery life.

It has unexpectedly been found that the composition described herein above is capable of forming a thin sheet material which exhibits good rheological properties for suitable processing into the desired interseparator diaphragm, for processing during formation of the alkaline battery system, and for retention of integrity during subjection to the chemical and physical forces while in use in an alkaline battery system. The ability to form thin sheets causes increased energy density of the resultant battery system. Although sheets can be formed of any desired thickness, such as about 5 to 20 mils, sheet products can be formed of less than about 10 mils thick and readily formed into sheets of from about 3 to about 8 mils. The thinness of the formed sheets and their ability to exhibit good rheological properties and integrity are all highly desired properties for the formation of an alkaline battery interseparator.

The process of forming the subject interseparator sheet material can be done with the aid of a conventional paper making machine. Initially, an aqueous slurry of the above described components is formed. The slurry has a mixture of solid components comprising from 30 to 70 percent polyolefin synthetic pulp, from 15 to 65 percent alkaline resistant inorganic filler, and from 1 to 35 percent of synthetic polymeric long fiber material. The slurry is treated with retention aid which, preferably, comprises a cationic polyacrylamide and an anionic polyacrylamide. It is preferred that the cationic and anionic agents, as described above, be added sequentially with the cationic agent first. It has been found desirable to employ low levels of from about 1 to 5 percent of alum (aluminum sulfate) to the slurry prior to forming the web on the paper machine to further enhance the efficiency of the retention aids. The alum can be added to the slurry at any time but, preferably, is added prior to the ionic agents. Alum is defined here to be any paper making grade of aluminum sulfate. The resultant slurry to be used in forming the web, preferably, can have a solid content in the range of from about 0.005 to 5 percent, but must be sufficiently low to readily permit formation of a tin web, as discussed below.

The slurry is then formed into a web such as depositing it on a web forming apparatus, such as a rotoformer or Fordinier paper making apparatus. The slurry should be deposited at a rate such that the solids deposited are of sufficiently low content to form a resultant dried web of less than 10 mils thick. The deposition of solids should be at a grammage (gm/m$^2$) of less than 75 and, preferably, from 50 to 75. The rate of deposition will be directly related to the solid concentration of the formed slurry and of the speed of the web forming apparatus, as can be readily determined.

The deposited slurry forms a web by the removal of the water, as is done in accordance with conventional paper making operations. The resultant web is further dried by subjecting it to drying air or heat, or a combination thereof, to form an integral sheet product. During the drying operation or subsequent thereto, it is preferred that the sheet product be subjected to elevated temperatures of from about 125° C. to 150° C. for a period of time to cause partial fusing of the pulp fibers. This fusion further enhances the integrity of the resultant product and can be readily accomplished by having the sheet product pass over steam heated rollers or cans during or after the drying operation.

It has been unexpectedly found that when the resultant sheet product is subjected to a calendering apparatus comprising of at least 2 rolls at sufficient pressure and temperature to cause the sheet to have a thickness of less than about 7 mils, its electrical and wicking properties are further enhanced.

FIG. 1 depicts a paper making apparatus suitable for forming the subject nterseparator. The synthetic polyolefin pulp is mixed with water and filler in pulper 10. After substantial homogeneous mixing is attained, the mixture is transferred by pump 12 and transfer line 13 to chest 14 where addition of long fibers is done, and substantially uniform slurry is attained. The slurry is removed from chest 14 by transfer line 15 and pump 16. Part of the slurry in transfer line 15 is recirculated via line 17 to chest 14, and the remaining part passes through metering stuff gate 18 into dilution box 20. The cationic agent metering device 21 is between the stuff gate 13 and the dilution box 20. The anionic agent metering device 22 is about 3 feet downstream in the dilution box 20 which is about 5 feet long. The diluting water is fed into the dilution tank from 23 to cause the solid content to be sufficiently low to cause the formed web to have a thickness of not greater than 10 mils.

The diluted slurry is pumped by pump 24 from the dilution box via transfer line 25 into the head box 26. The rotoformer drum 27 rotates in the head box picking up the slurry and forming a web, the rate of rotation of drum 27 being sufficient to have the web formed of a thickness of not greater than 10 mils. Two vacuum boxes 28 and 29 are present. A lump breaker 30 opposite drum 27 is provided for optional use.

The web is removed from the rotoformer drum 27 and passed over a felt 31. The felt conveying means 31 feeds the formed web to oven 32 and then to a series of drying cans 33, 34, 35, 36, and 37 in sequence. Some, or all, of the cans may be heated to further aid in drying of the formed web, and to cause partial fusion of the fibers. The web may, optionally, be subjected to calender cylinders 38, 39, and 40 under sufficient temperature and pressure to cause the web to further consolidate and form a sheet of less than about 7 mils. The sheet product is taken up on windup station 41.

It has been unexpectedly found that when one utilizes the present combination of a major amount of short fibered synthetic polyolefin pulp with a minor amount of long fibers, and with alkali resistant particulate filler, one can form, with the aid of a combination of cationic and anionic agents, thin iterseparator sheet material having superior properties. The subject interseparator has been found to exhibit the combination of desired properties of low electrical resistance, good wicking properties, good resistance to attack by conventional alkaline electrolyte, good tensile properties, and good capability to form a thin sheet product.

The term "sheet" is intended in the subject application to define a substantially planar material. The sheet is generally less than about 15 mils thick. The present composition permits formation of sheets of less than about 10 mils thick and, preferably, from about 3 to about 7 mils thick. Because of the requirement of utilizing a combination of a dentristatic separator with at least one and, perhaps, two iterseparator sheets (one on each side of the dendristatic separator) between plates of opposite polarity in an alkaline secondary battery system, the thickness of the interseparator is critical.

The following examples are given for illustrative purposes only and are not meant to be a limitation on the subject invention, except as made in the claims appended hereto. All parts and percentages are by weight unless otherwise indicated.

EXAMPLE I

A slurry was formed in a conventional paper making pulper by charging 1000 parts of water to the pulper followed by 47.5 parts of a commercially available short fibered synthetic polyethylene pulp with a fiber average length of 1 mm, cross section area on the order of a few square microns and specific surface area on the order of 10 m$^2$/g. (PULPEX, a product of Solvay & Cie). This was pulped for about 25 minutes. Then 47.5 parts of titanium dioxide particulate material (P-25, a product of Degussa) having a surface area of about 65 m$^2$/gm and a pore volume (N$_2$) of 0.34 cc/gm was added, and the pulper was then operated for an additional 10 minutes to permit the titanium dioxide to mix well. Then 800 parts of additional water was added to aid in more complete mixing and to flush out the pulper.

The pulper contents were transferred to the chest of a laboratory rotoformer paper machine. Five parts of long fibers were added. The long fibers were polyethylene terephthalate staple fibers 1.5 denier×¼" supplied by Minifibers, Inc. Thereafter, about 5500 parts of water was added. Next, 2.0 parts of ground paper makers alum (aluminum sulfate-iron free ground product of DuPont) was added. After thorough mixing and dissolving of the alum, the slurry was allowed to stand for about 1 hour. The aqueous slurry was then transferred from the chest to a dilution box just upstream of the headbox.

The mix was diluted with water in the dilution box to about 0.06 weight percent solids. A cationic acrylamide containing copolymer (RETEN 210, a product of Hercules, Inc.) was metered into the dilution box at a concentration of 0.04% in water at 800 ml/minute. An anionic acrylamide containing copolymer (RETEN 421, a product of Hercules, Inc.) was metered into the dilution box about 3 feet downstream of the box's 5 foot length at a concentration of 0.025% in water at 800 ml/min.

This diluted mix was then transferred to the head box at a rate such that the web formed on the rotoformer has a grammage of 66. While on the rotoformer, a lump breaker roll operated at 80 psi to smooth out the top surface of the web. The wire of the rotoformer travelled at a rate of 35 feet/minute. Due to the travelling rate of the rotoformer and the rate of transfer of the diluted slurry, the resultant web was capable of being formed of a caliper or thickness of about 7 mils. After leaving the rotoformer, and while still resting on a moving belt, the web was pressed by opposing hard rolls to consolidate and cause uniformity of the caliper of the web.

The web was then transferred from the wire to an open mesh metal belt and passed through an oven where it was dried to a water content of about 10 lbs. of water for every 10 lbs. of solid web. It was not necessary to heat the oven.

The web, upon leaving the oven, was transferred to 6 steam cans (drums having circumferences of about 12 feet) operated at surface temperatures of about 270° F. The web was substantially completely dried on the first three cans. The web was then passed over 2 cans at about 70° F. It is believed that some bonding by melting of the polyolefin fibers has occurred at some of the fiber junctions. Rubbing of the web with the finger nail showed good web integrity.

The web was then wound up and afterwards cut to desired interseparator sizes.

EXAMPLE II

The procedure of Example I was carried out except as follows: 47.5 parts of polyethylene synthetic pulp (EST-4, a product of Mitsui-Zellerbach), 47.5 parts of the filler, and 5 parts of the polymeric long fiber were used. The rate of transfer from the dilution box was set to yield a grammage of 66. The resultant web had a caliper of 7 mils.

EXAMPLE III

The procedure of Example II was carried out, except as follows: 35 parts of the synthetic pulp, 60 parts of the filler, and 5 parts of the long fiber were used. The rate of transfer from the dilution box to the head box was set to yield a gammage of 71. The resultant web had a caliper of 6 mils.

EXAMPLE IV

The procedure of Example II was carried out, except as follows: 47.5 parts of the synthetic pulp, 47.5 parts magnesium oxide (Maglite-A, a product of Whitaker, Clarke & Daniel) having a particle surface area of 178 m$^2$/gm and a pore volume of 0.44 cc/gm, and 5 parts of the long fiber were used. The rate of transfer from the dilution box to the head box was set to yield a grammage of 61. The first six steam cans were operated at about 260° F., while the last two cans were maintained at about 70° F. The caliper of the interseparator was 7 mils.

EXAMPLE V

The procedure of Example I was followed, except as follows: 47.5 parts of synthetic pulp, 47.5 parts of alumina (Aluminum Oxide-C of Degussa) having a surface area of 94 m$^2$/gm and a pore volume (N$_2$) of 0.8 cc/gm, and 5 parts of long fibers were used. The rate of transfer of the slurry from the dilution box was set to yield a grammage of 63. The caliper of the interseparator was about 7 mils.

EXAMPLE VI

The product of Example VI was continuously treated to calendering (2 steel rolls, 1 nip) under high pressure, at linear speed of 8 ft/min with roll temperature of 90° C. The caliper of the interseparator was about 5 mils.

EXAMPLE VII

Example VI was repeated, except that the rolls were maintained at 25° C. and the linear speed of the material was 2 ft/min. The caliper was 5 mils.

The battery interseparators produced by the above methods were tested and the results are tabulated in Table 1. The parts of the major constituents in the furnish equal 100% and ignore the small percentage of processing aids and the like.

The testing used in establishing the value in Table 1 was carried out on samples post treated with 1 percent solution of nonionic surfactant, ethyloxylated alkyl phenol, and dried as follows:

Tensile—A Scott Tester or Instron Tensile Tester (Model TM) using a sample width of 1 inch and a 2 inch jaw separation, and a cross head speed of 12"/min.

Electrical Resistance—The procedure indicated in "Characteristics of Separator for Alkaline Silver Oxide Zinc Secondary Batteries—Screening Methods" by J. E. Copper and A. Fleischer, Direct Current Method on Page 53.

Porosity Volume %—Void volume % is calculated from wet weight (WW) minus dry weight (DW) divided by separator geometric wet volume (SGV). $(WW-DW)/SGV10^2 = \%$ Porosity.

Wicking Rate—Determined as distance of electrolyte movement up a dry interseparator sample suspended vertically with one cm immersed into a 33% KOH solution for a 24 hour period of time.

Average Pore Size—The procedure indicated in "Characteristics of Separator for Alkaline Silver Oxide-Zinc Secondary Batteries—Screening Methods" by J. E. Cooper and A. Fleischer, Water Permeability Method, Page 31.

Maximum Pore Size—Bubble Test of ASTM F316-70.

TABLE I

| Example | Grammage (gm/m²) | Thickness (mils) | Tensile* Strength (lb/in²) | Max Pore Size (μ) | Average Pore Size (μ) | Electrical Resistance (millohm-in²) | Porosity (%) | Wick Rate (cm/24 hr) |
|---|---|---|---|---|---|---|---|---|
| 1 | 66 | 7 | 360 | 27 | 2.6 | 12 | 75 | >16 |
| 2 | 66 | 7 | 630 | 25 | 2.3 | 17 | 62 | >16 |
| 3 | 71 | 6–7 | 450 | 23 | 1.1 | 10 | 69 | >16 |
| 4 | 61 | 7 | 520 | 21 | 0.7 | 27 | 61 | 8.4 |
| 5 | 63 | 8 | 540 | 16 | 0.5 | 15 | 73 | 6.0 |
| 6 | 63 | — | — | — | — | — | — | —** |
| 7 | 63 | 5 | — | 16 | 0.3 | 19 | 62 | 7.8 |

*Machine direction.
**Assumed similar to Example VII.

While the invention has been described in connection with certain preferred embodiments, it is not intended to limit the invention to the particular form set forth, but on the contrary, it is intended to cover such alternatives, modifications, and equivalents as defined by the appended claims.

What is claimed is:

1. A battery interseparator suitable for use in an alkaline battery system comprising a porous sheet material of less than about 10 mils thickness formed from a substantially uniform mixture of from about 30 to 70 weight percent polyolefin synthetic pulp, from about 15 to 65 weight percent of an alkali resistant inorganic filler, from about 1 to 35 weight percent of long synthetic fibers having lengths of at least about 0.25 inch and a combination of cationic agent and anionic agent in an effective amount of from about 0.01 to 1 weight percent to retain said inorganic filler therein.

2. The battery interseparator of claim 1 wherein said polyolefin synthetic pulp is selected from polyethylene polypropylene or a combination thereof, said inorganic filler is selected from titanium dioxide, alumina, magnesia, calcium oxide, calcium hydroxide, calcium titanate, potassium titanate, zirconium hydroxide or magnesium hydroxide, or mixtures thereof; and said long synthetic fibers are formed from a polyester, polyolefin, polyamide, polyacetate, polyacrylate, or polyacrylic.

3. The battery interseparator of claim 1 wherein the long fiber synthetic polymer is present in an amount from 1 to 15 percent formed from polyolefin polyamide or polyester, and are present in not greater than 50 weight percent of said synthetic pulp.

4. The battery interseparator of claim 1 wherein the filler is selected from titanium dioxide, alumina, magnesia or mixtures thereof.

5. The battery interseparator of claim 1 wherein said polyolefin synthetic pulp is comprised of polyethylene.

6. The battery interseparator of claim 1 wherein said alkaline resistant inorganic filler is comprised of titanium dioxide with specific surface area of at least 10 m²/g.

7. The battery interseparator of claim 1 wherein the maximum pore size is less than 35 microns.

8. The battery interseparator of claim 1 wherein the average pore diameter is less than 10 microns.

9. The battery interseparator of claim 1 wherein the electrical resistance is less than about 25 milliohms-square inch.

10. The battery interseparator of claim 1 further comprising about 1 to about 5 weight percent alum.

11. The battery interseparator of claim 1 wherein the long fibers are formed from a polyester, polyamide or polyolefin, are present in an amount of from about 1 to 15 weight percent and not greater than about 50 weight percent of said synthetic pulp, and are of deniers of about 1.5 to about 6 and lengths of about 0.25 to about 1 inch, the alkaline resistant inorganic filler has particle sizes of about 0.001 to 1 micron and a surface area of at least 10 m²/g, the maximum pore size is up to about 35 microns, and the polyolefin synthetic pulp fibers are at least partially melt bonded.

12. The battery interseparator of claim 11 comprising about 0.01 to about 0.15 weight percent of a cationic copolymer containing acrylamide and about 0.01 to about 0.15 weight percent of an anionic copolymer containing acrylamide.

13. The battery interseparator of claim 2 wherein said long synthetic fibers are formed from polyester.

14. The battery interseparator of claim 2 wherein said long synthetic fibers are formed from polyolefin.

15. The battery interseparator of claim 2 wherein said long synthetic fibers are formed from polyamide.

16. The battery interseparator of claim 2 wherein said long synthetic fibers are formed from polyacetate.

17. The battery interseparator of claim 2 wherein said long synthetic fibers are formed from polyacrylate or polyacrylic.

18. The battery interseparator of claim 2 wherein the synthetic pulp is formed from fibers having an average length of from about 1 to 4 millimeters, the alkali resistant filler has a particle size of from about 0.001 to 1 micron, a surface area of from about 5 to 200 square meters per gram and a pore volume of from about 0.01 to 1 cc per gram; the long fibers are of a denier of from about 1.5 to 6, a length of from about 0.25 to 1 inch, and at a concentration of not greater than 50 weight percent of the synthetic pulp; an average pore diameter of less than 10 microns; and a maximum pore size of less than 35 microns.

* * * * *